United States Patent
Zeindler

[11] Patent Number: 5,743,648
[45] Date of Patent: Apr. 28, 1998

[54] COMBINATION PACIFIER AND THERMOMETER

[75] Inventor: Kurt R Zeindler, Miami, Fla.

[73] Assignee: Medec Establishment Ltd., Nassau, Bahamas

[21] Appl. No.: 747,338

[22] Filed: Nov. 12, 1996

[51] Int. Cl.⁶ .................... G01K 13/00; G01K 7/22; A61B 5/00; A61J 17/00
[52] U.S. Cl. .............. 374/151; 128/736; 215/11.2; 606/236; 606/234
[58] Field of Search ................ 374/151; 128/736; 606/234, 235, 236; 215/11.2

[56] References Cited

U.S. PATENT DOCUMENTS

| | | | |
|---|---|---|---|
| D. 268,651 | 4/1983 | Doyle | D10/57 |
| 3,117,450 | 1/1964 | Hoy | 374/151 |
| 3,968,690 | 7/1976 | Blouin et al. | 374/151 |
| 4,072,054 | 2/1978 | Blouin et al. | 374/151 |
| 4,447,164 | 5/1984 | Berndt | 374/151 |
| 4,511,265 | 4/1985 | Berndt | 374/151 |
| 4,716,902 | 1/1988 | Swartz . | |
| 5,013,160 | 5/1991 | Massey et al. | 374/151 |
| 5,033,864 | 7/1991 | Lasecki et al. | 374/151 |
| 5,176,704 | 1/1993 | Berndt | 128/736 |
| 5,178,466 | 1/1993 | Chiu | 128/736 |
| 5,178,467 | 1/1993 | Chen | 374/151 |
| 5,211,479 | 5/1993 | Coffey et al. | 374/151 |
| 5,312,187 | 5/1994 | Chiu | 128/736 |
| 5,534,013 | 7/1996 | Zeindler | 606/234 |
| 5,581,238 | 12/1996 | Chang et al. | 374/151 |
| 5,611,622 | 3/1997 | Wang | 374/151 |

FOREIGN PATENT DOCUMENTS

| | | | |
|---|---|---|---|
| 1025231 | 1/1978 | Canada | 374/151 |
| 0227569 | 1/1925 | United Kingdom | 374/151 |

*Primary Examiner*—Diego F. F. Gutierrez
*Attorney, Agent, or Firm*—Dickinson, Wright, Moon, Van Dusen & Freeman

[57] ABSTRACT

A pacifier thermometer includes a thermometer that is removable from a base portion, which includes a nipple, to allow thorough cleaning of the base portion. The thermometer includes a flexible conductor that has a thermistor at its end, and the thermistor rests on the nipple when assembled. In a second embodiment, the nipple includes a metal sensor that is molded into the silicone nipple and provides a hole for removably receiving the thermistor.

13 Claims, 3 Drawing Sheets

5,743,648

COMBINATION PACIFIER AND THERMOMETER

CROSS REFERENCE

This application corresponds to U.S. provisional application 60/006,550, filed Nov. 13, 1995.

TECHNICAL FIELD

This invention relates to the art of thermometers for infants. In particular, the invention is a thermometer for an infant that is combined with a pacifier.

BACKGROUND

It is often necessary to determine the temperature of an infant. As is well known, an oral thermometer is often difficult to use because of the infant's resistance to having the thermometer placed in the mouth. In many instances, the infant will bite the thermometer, which can be very dangerous if the thermometer breaks.

Combinations of infant thermometers and pacifiers are known. For example, U.S. Pat. No. 5,534,013 shows a pacifier thermometer that teaches the use of a metal button for reducing the time taken for the thermometer to respond to the child's temperature.

Prior pacifier thermometers have not provided for easy disassembly to permit, for example, cleaning of the parts. It is often desirable to detach the thermometer and its associated electronics to allow the nipple portion to the washed thoroughly in a dishwasher.

SUMMARY OF THE INVENTION

In accordance with the invention, a baby's thermometer comprises two parts. A first part includes a silicone nipple, a base element, and a washer. The second part includes a thermometer housing and thermometer electronics that fits into the washer for attachment to the base. The thermometer includes a flexible thermocouple that extends into the hollow nipple and includes an end that rests on the end of the nipple interior. The nipple is made of silicone and is heat conductive whereby the temperature of the baby's tongue is effectively transmitted to the thermocouple. The temperature is then displayed by the thermometer.

In a second embodiment, the nipple includes a metal button for engaging the tongue of the child and for transmitting the temperature of the child to the thermocouple more rapidly than by the silicone alone.

Because the thermometer is a separate part, it may be detached easily from the base and nipple to allow the nipple to be washed, or used alone.

BRIEF DESCRIPTION OF THE DRAWINGS

FIGS. 4b and 4c are front and rear views, respectively, of the washer of FIG. 4a.

FIG. 5b is a rear view of the housing top of FIG. 5a.

DETAILED DESCRIPTION OF THE PREFERRED EMBODIMENT

Figure 1:
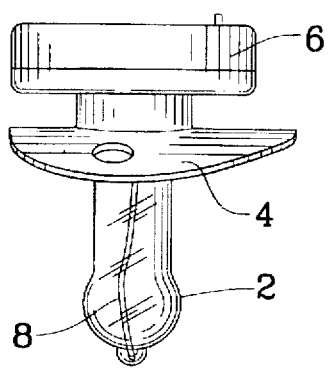
FIG. 1 is a side view of a pacifier having a thermometer in accordance with the invention.

With reference to FIG. 1, a pacifier in accordance with the invention comprises a silicone nipple 2 that is secured to a base element 4. The nipple is made of silicone in known manner. Attached to the base plate is a thermometer 6 that includes electronics as known in the art and a conductor 8 that includes a thermocouple or thermistor 11 at its end. The wire is flexible and extends through the interior of the nipple so that the thermistor rests on the end of the nipple. The nipple includes a protuberance 5 for receiving the temperature measuring element.

Figure 1A:
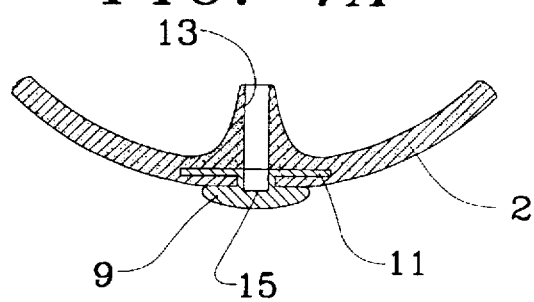
FIG. 1a is a cross section of the tip of a second embodiment of a thermometer pacifier in accordance with the invention.

FIG. 1a illustrates a second embodiment of the invention similar to that shown in FIG. 1 but wherein the nipple is modified to include a metallic sensor. In accordance with this embodiment, a sensor element comprising a front part 9 and a rear securing element 11 are molded into the silicone nipple. The rear securing element is a rather large disk for ensuring that the sensor is securely held in the nipple. The sensor element is made of a highly conductive material, such as brass, and is located with respect to the remainder of the nipple to contact the baby's tongue when the pacifier is in place. Thus, the temperature of the baby's tongue is transmitted to the sensor 9 very efficiently. Because the sensor is molded into the silicone, the baby is not able to remove it by biting the nipple The embodiment shown in FIG. 1a further includes a silicone tube 13 that is aligned with a hole 15 in the sensor. The tube 13 is designed to removably receive the wire 8 and guide it into the hole whereby the thermistor 31 will rest on the sensor and make good thermal contact therewith when the thermometer is in place. The wire and thermistor may be removed as will be more apparent from the following description.

Figure 2:
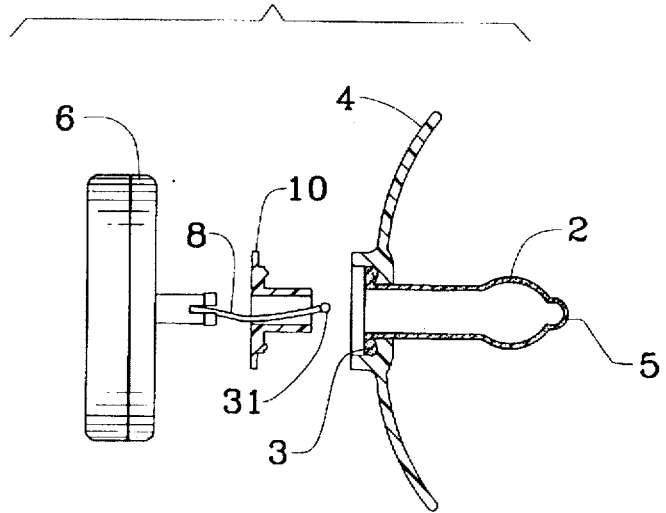
FIG. 2 is an exploded diagram of the pacifier shown in FIG. 1.

FIG. 2 illustrates the remainder of the construction of the pacifier in more detail. One end of the nipple includes a flange 3 that is held in an opening in the base plate. A washer 10 is inserted into the opening to engage the flange of the nipple and to provide a receptacle for an extended end portion of the thermometer. The washer is preferably secured to the base plate, as by ultrasonic welding, and the thermometer is removable to allow the nipple and base to be cleaned without subjecting the electronics of the thermometer to the sterilizing temperature that are preferred for washing the nipple.

Figure 3A:
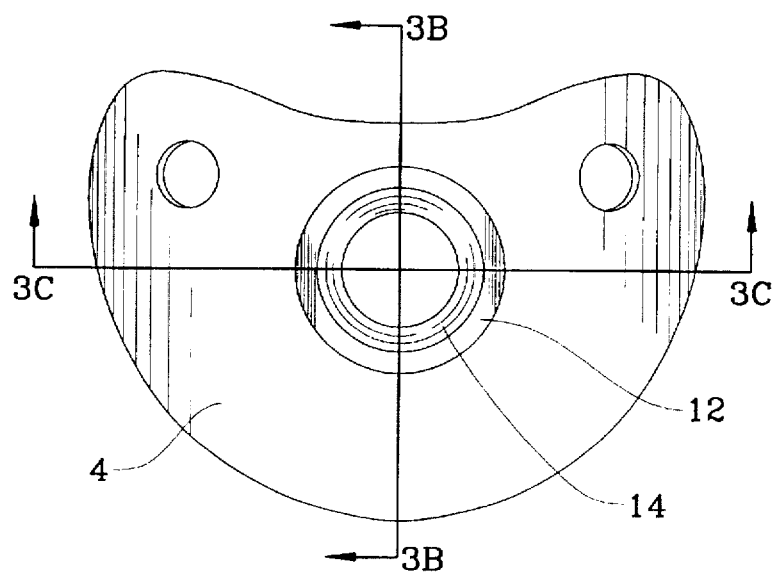
FIG. 3a is a front view of a base plate.
Figure 3B:
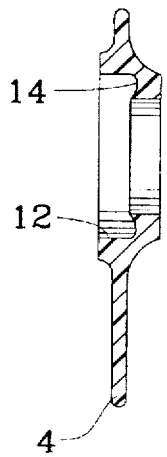
FIGS. 3b and 3c are cross sections of the base plate of FIG. 3a taken along lines 3b—3b and 3c—3c, respectively.
Figure 3C:
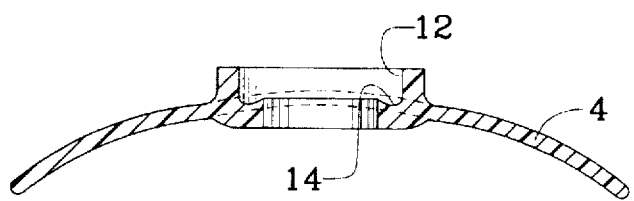

The base element is shown in FIGS. 3a, 3b, and 3c. The base element is preferably made of relatively hard plastic and provides an opening surrounded by a cylindrical ridge 12. The ridge is contiguous with a flange 14, which forms a smaller opening and receives a flared part of the nipple.

Figure 4A:
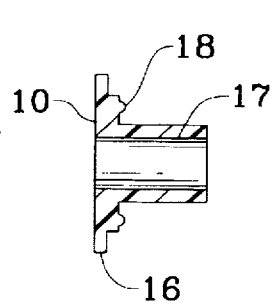
FIG. 4a is a transverse cross section of a washer.
Figure 4B:
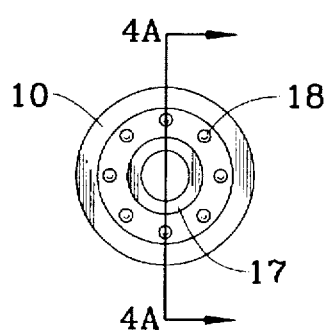
Figure 4C:
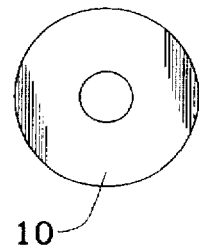

The washer 10 is shown more clearly in FIGS. 4a, 4b, and 4c. The washer includes a disk portion 16 that engages the top of the cylinder 12 of the base element after assembly. And, a protruding portion 17 extends through the opening formed by the flange 14 after assembly. The washer also includes spikes 18 for engaging the flared part of the nipple and securing it to the flange 14. Thus, during assembly the washer is placed in the opening in the base element after the silicone nipple is in place and is secured as by welding, cement, or the like.

Figure 5A:
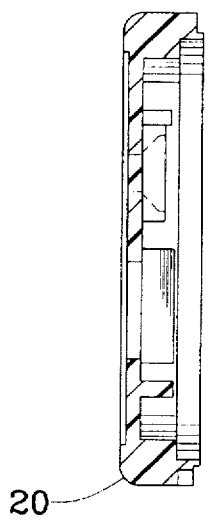
FIG. 5a is a transverse cross section of a housing top.
Figure 5B:
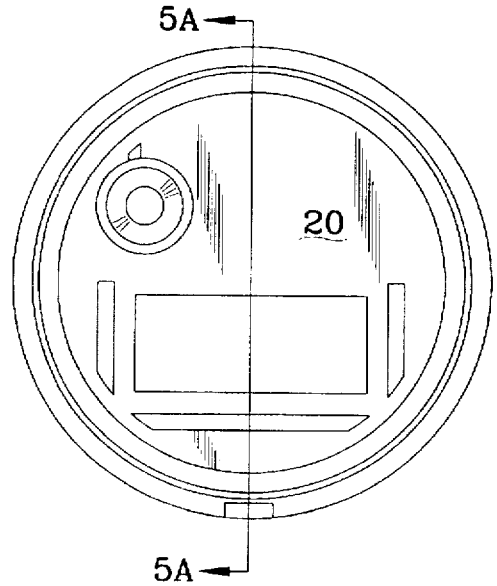
Figure 6A:
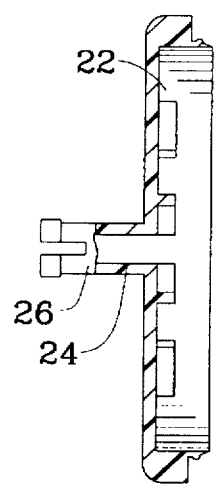
FIG. 6a is a transverse cross section of a housing bottom.
Figure 6B:
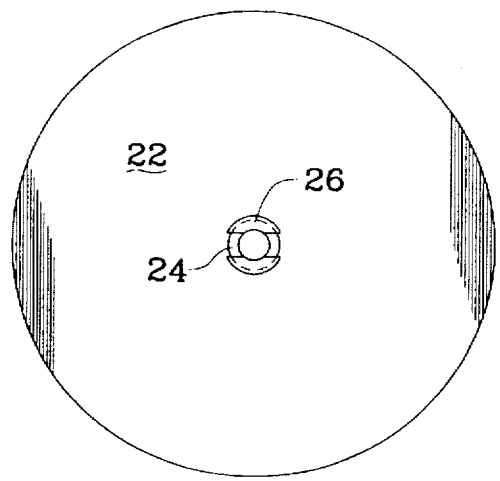
FIGS. 6b and 6c are front and rear views of the housing bottom of figure.
Figure 6C:
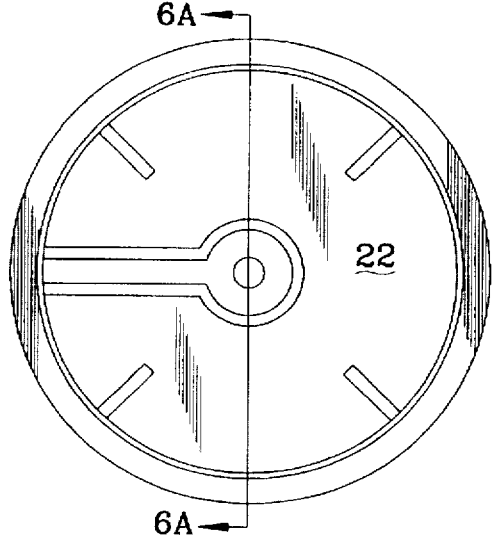

FIGS. 5 and 6 show the two parts of the housing for the thermometer. The top part 20, shown in FIGS. 5a and 5b, forms a part of a cavity and provides a window for viewing the display of the thermometer as well as an opening for a reset button for the thermometer electronics. The bottom portion 22, shown in FIGS. 6a, 6b, and 6c, forms the remainder of the cavity and provides a guide end 24 through which the thermocouple wire extends. The guide end also includes a resilient ridge 26 for resiliently engaging the protrusion 17 on the washer for securing the housing to the washer and yet allowing the thermometer to be detached from the washer for cleaning.

It may also be desired to use the pacifier without the thermometer. In such a case the thermometer is removed and a button (not shown) is inserted in place of the thermometer.

Modifications within the scope of the appended claims will be apparent to those of skill in the art.

I claim:

1. A pacifier and thermometer assembly comprising:

a base having a flange forming an opening, a flexible nipple for being received in the mouth of a user, said nipple having a flange engaging said flange of said base for securing said nipple to said base, washer means for engaging said flange of said nipple for securing said flange of said nipple to said flange of said base, and thermometer means for measuring the temperature of a user, wherein said thermometer means comprises a temperature sensing element for engaging said nipple and a guide end means, said guide means extending through said opening and having means for removably engaging said washer means to removably attach said thermometer means to said base.

2. A pacifier and thermometer assembly according to claim 1 wherein said guide end means has a resilient ridge means thereon for removably engaging said washer means.

3. A pacifier and thermometer assembly according to claim 1 wherein said washer means includes protrusions for engaging said flange of said nipple.

4. A pacifier and thermometer assembly according to claim 1 wherein said washer means includes a protrusion that receives said guide end means.

5. A pacifier and thermometer assembly according to claim 1 wherein said nipple further comprises a sensor means for conducting heat rapidly to said thermometer means.

6. A pacifier and thermometer assembly according to claim 5 wherein said sensor means comprises a metal disk molded into said nipple and said disk has a hole for removably receiving a conductor portion of said thermometer means.

7. A pacifier and thermometer assembly according to claim 6 wherein said temperature sensing element includes a thermistor for engaging said sensor means.

8. A pacifier and thermometer assembly according to claim 6 further comprising a guide tube for guiding said conductor portion into contact with said sensor means.

9. A pacifier and thermometer assembly according to claim 1 wherein said thermometer means further comprises a conductor portion for extending through said opening and said temperature sensing element is mounted on said conductor portion.

10. A pacifier and thermometer assembly according to claim 9 wherein said nipple has a protuberance at an end of said nipple opposite said flange for receiving said temperature measuring element.

11. A pacifier and thermometer assembly according to claim 1 wherein said washer means is cemented to said base.

12. A pacifier and thermometer assembly according to claim 1 wherein said washer means is welded to said base.

13. A pacifier and thermometer assembly according to claim 1 wherein said base includes a cylinder adjacent said flange for receiving said flange of said washer means.

* * * * *